Oct. 22, 1935.  F. E. FOWLER  2,018,125
BEVERAGE MIXER
Filed Feb. 13, 1935     4 Sheets-Sheet 2
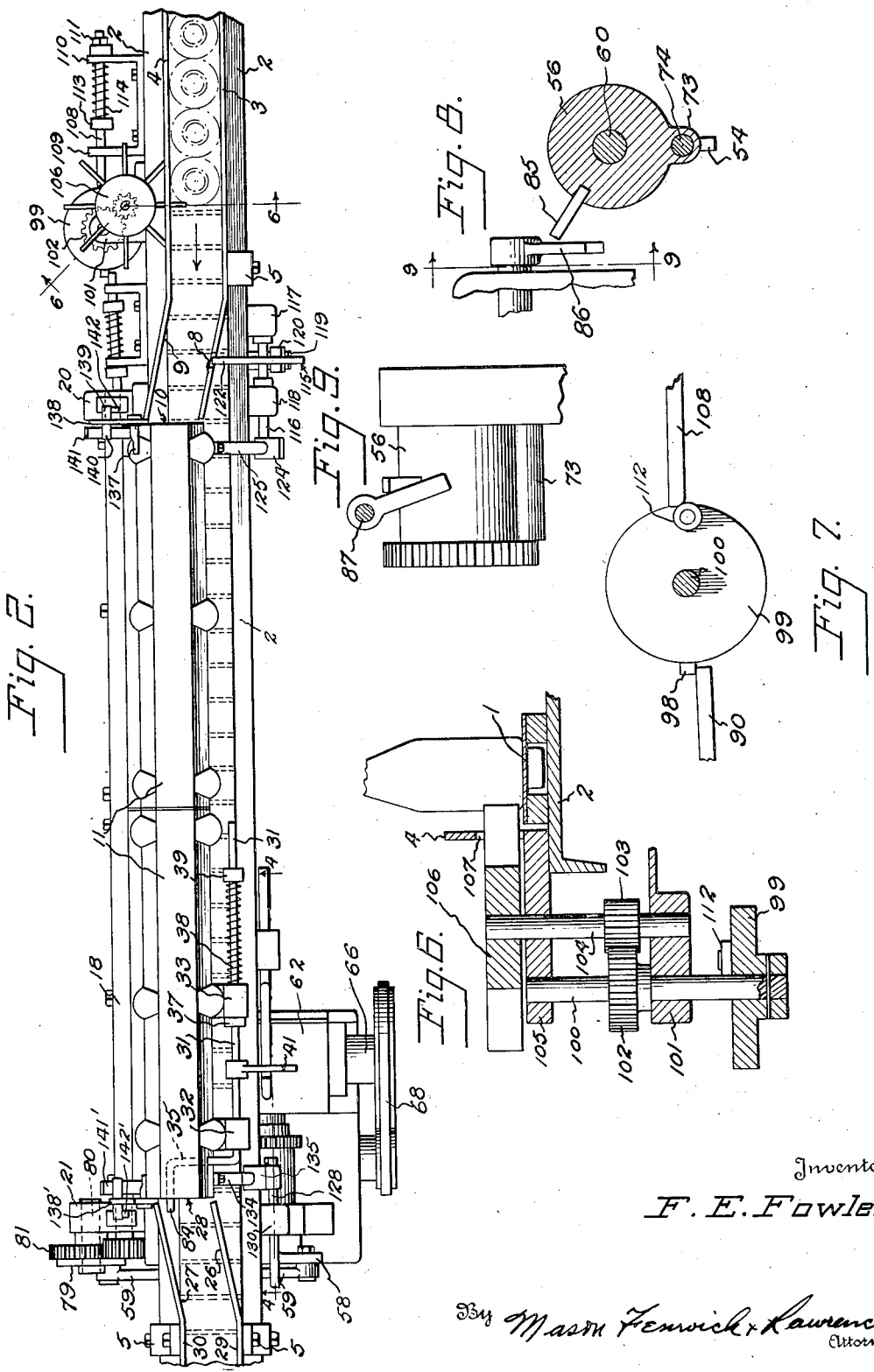
Inventor
F. E. Fowler
By Mason Fenwick & Lawrence
Attorneys

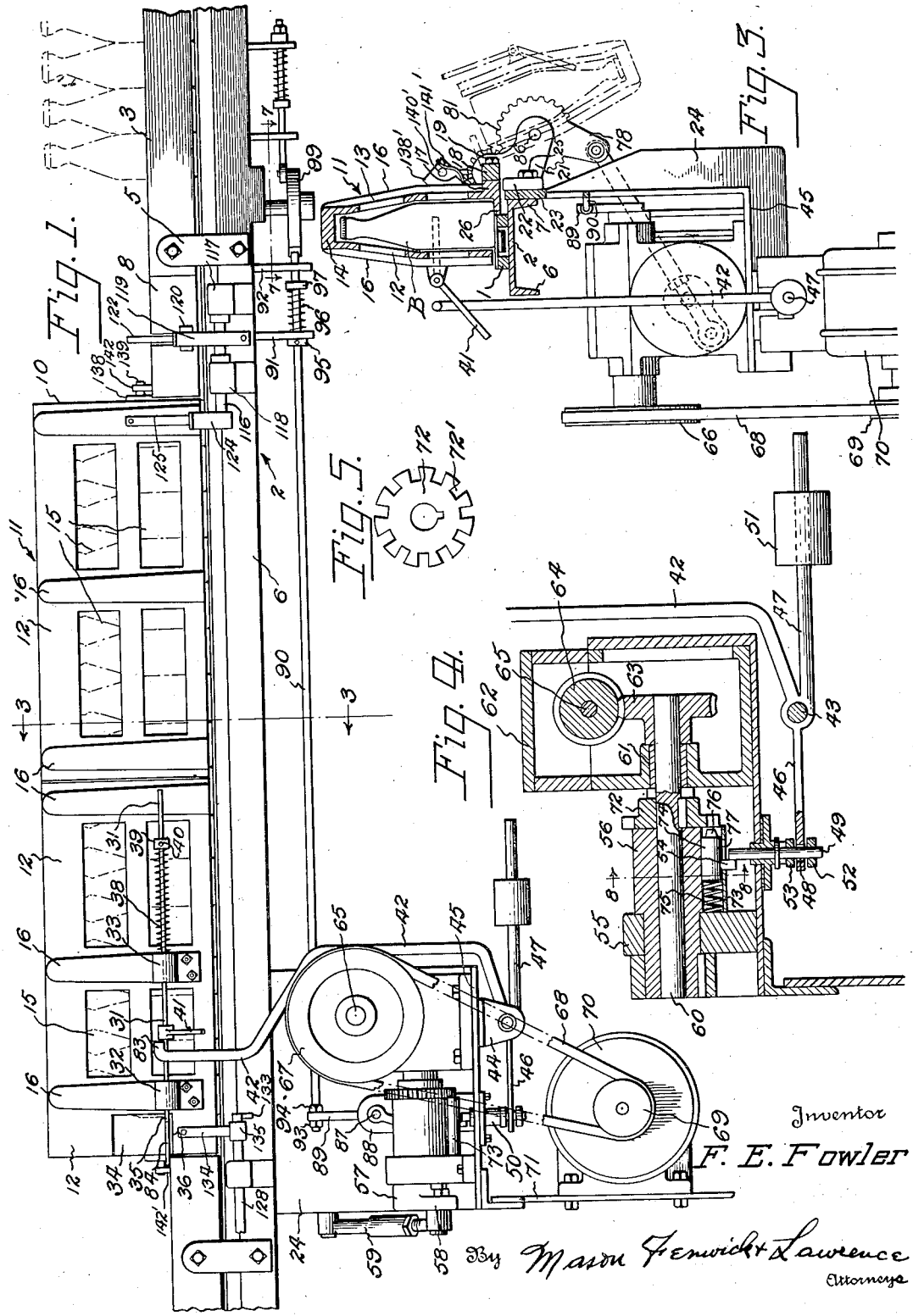

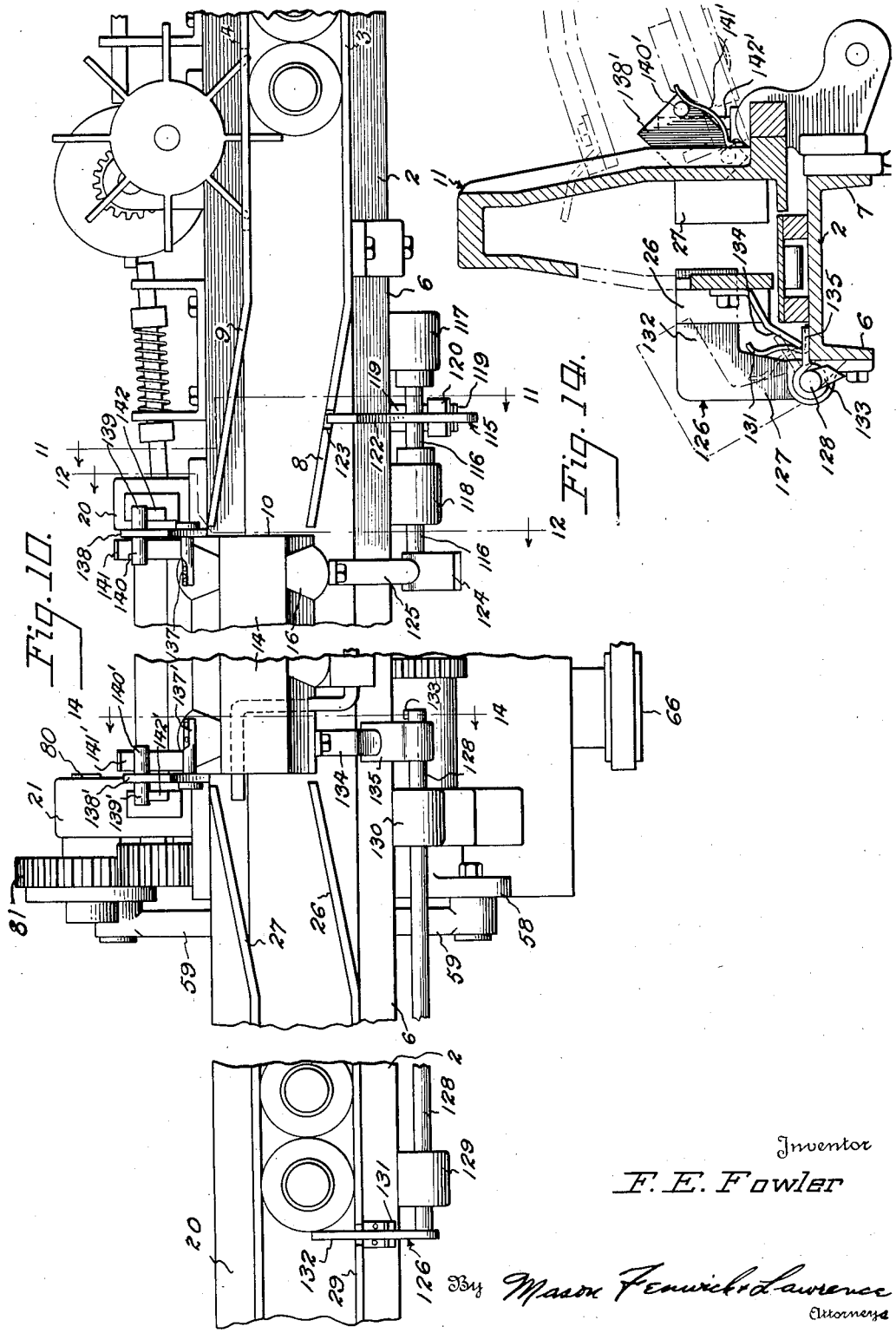

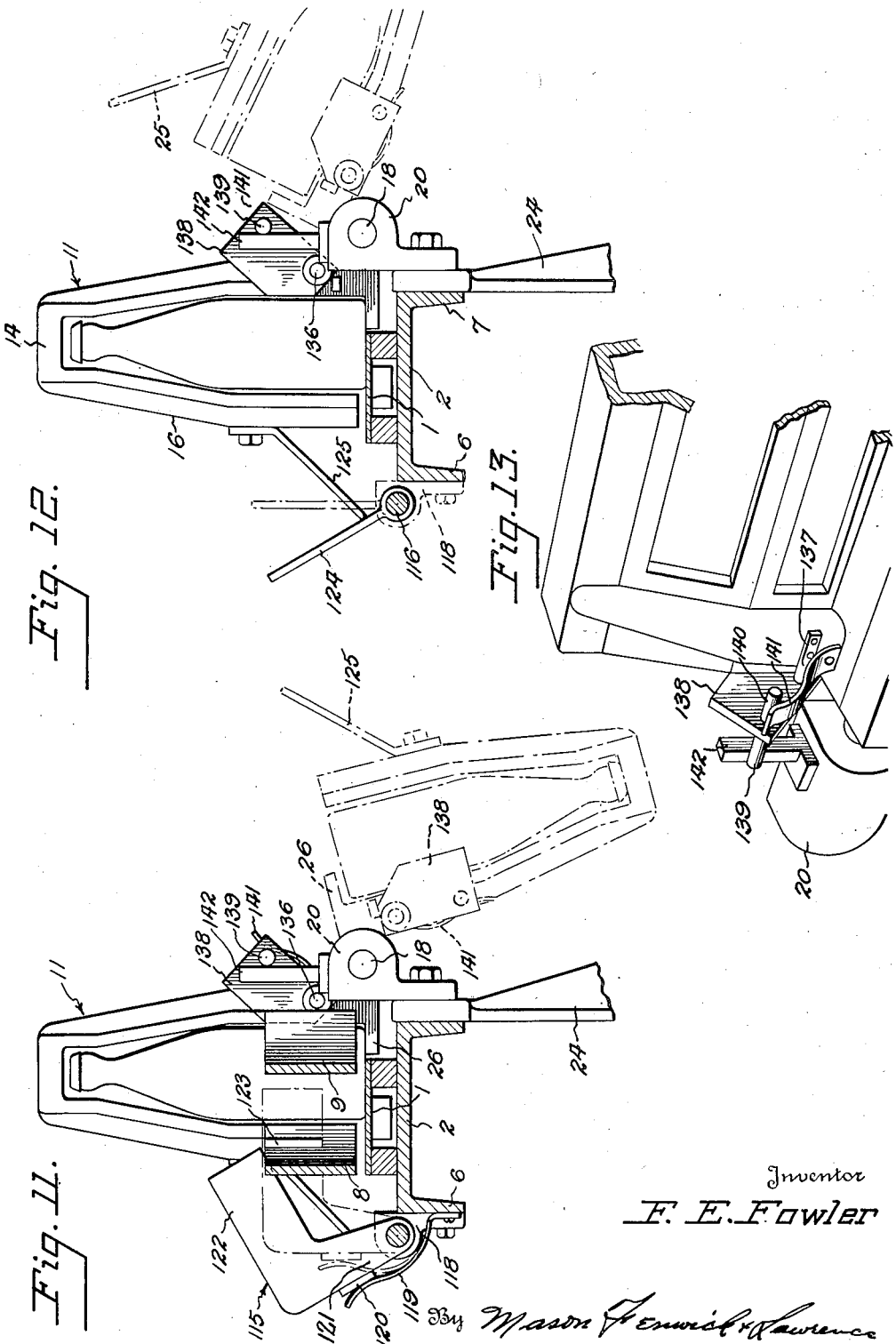

Patented Oct. 22, 1935

2,018,125

UNITED STATES PATENT OFFICE 2,018,125

BEVERAGE MIXER

Frank E. Fowler, Athens, Ga., assignor to Beverage Mixer Co., Bainbridge, Ga.

Application February 13, 1935, Serial No. 6,367

11 Claims. (Cl. 259—54)

The invention forming the subject matter of this application comprises apparatus designed for automatically mixing the ingredients of beverages in bottles previously filled and closed by any suitable means.

In the present low pressure method of filling bottles with carbonated beverages, the flavoring syrup is first introduced into the bottles and carbonated water is then added to the syrup to fill the bottles. The filled bottles are then crowned or otherwise closed; and are usually forwarded in upright position to a stock or crating room, where they are manually agitated to mix the syrup and carbonated water.

The main object of the present invention is, therefore, to provide a device in which the mixing of the ingredients in the filled and closed bottles is effected mechanically and automatically, thereby eliminating the costly and time consuming method now in common use.

Other objects of the invention will become apparent as the detailed description thereof proceeds.

In the drawings:

Figure 1 is a fragmentary side elevation of the apparatus embodying the present invention;

Figure 2 is a plan of the apparatus shown in Figure 1;

Figure 3 is a vertical transverse section taken on the line 3—3 of Figure 1;

Figure 4 is a fragmentary vertical section taken on the line 4—4 of Figure 2;

Figure 5 is a fragmentary detail to an enlarged scale of a clutch disk forming part of the present invention;

Figure 6 is a vertical section taken on the line 6—6 of Figure 2;

Figure 7 is a horizontal section, to an enlarged scale, taken on the line 7—7 of Figure 1;

Figure 8 is a vertical transverse section, to an enlarged scale, taken on the line 8—8 of Figure 4;

Figure 9 is a vertical section taken on the line 9—9 of Figure 8;

Figure 10 is a fragmentary plan, to an enlarged scale, illustrating cooperative bottle stop mechanisms mounted at opposite ends of the mixing mechanism;

Figure 11 is a vertical transverse section taken on the irregular line 11—11 of Figure 10;

Figure 12 is a vertical transverse section taken on the irregular line 12—12 of Figure 10;

Figure 13 is a perspective sketch of certain details of construction shown in Figures 10, 11 and 12; and Figure 14 is a vertical transverse section taken on the line 14—14 of Figure 10.

As shown in the drawings, the invention includes a conveyor member 1 movable lengthwise of a base 2 forming part of the supporting framework of mechanism for conveying filled bottles from a filling and capping machine to a stock or crating room. The present invention is not concerned with the specific details of this supporting framework and conveyor mechanism, which may be of any standard construction.

Vertical guide plates 3 and 4, spaced apart at a distance slightly greater than the diameter of the bottles, are suitably secured above the member 1 by means of brackets 5 bolted or otherwise secured to the flanges 6 and 7 of the base 2. The inner ends of the plates 3 and 4 are connected to the laterally inclined vertical plates 8 and 9, respectively, which form means for guiding bottles to the inlet end 10 of a laterally offset bottle supporting chamber 11, adapted to be inverted for the purpose of mixing the ingredients in bottles fed thereto.

The chamber 11 is open at its opposite ends and is shaped as a casing having side walls 12 and 13 connected at their upper ends by a top 14 (see Figure 3). The walls 12 and 13 are provided with sight openings 15 through which bottles in the chamber may be inspected; and stiffening ribs 16 may be formed on these walls to strengthen the same without unduly adding to the weight of the chamber 11.

The lower end of the wall 13 is shaped to form an outwardly extending flange 17, having its outer edge machined to fit against one flat face of a square shaft 18, and being secured to said shaft by machine screws 19. The shaft 18 is mounted to rotate in bearing brackets 20 and 21 suitably secured to the rear flange 7. The bracket 20 is secured directly to the flange 7; but the bracket 21 includes a flange 22 (see Figure 3) which acts as a clamping plate to secure the upper end plate 23 of an L-shaped frame 24 to the flange 7. Machine screws 25 extend through flange 22 and end plate 23 into the flange 7 to secure these parts in proper relation to each other.

The wall 13, at its lower end, is also provided with an inwardly directed flange which serves as a bottom 26 for the chamber 11 to support the bottles B therein. The lower edge of the wall 12 terminates a slight distance above the plane of the upper surface of the bottom 26, forming a recess in which the conveyor belt 1 moves with its bottle supporting surface substantially flush with the said upper surface of the bottom 26 (see Figure 3).

It will be apparent from inspection of Figures 2 and 3 that the whole structure of chamber 11 is laterally offset toward the rear of the machine, to provide supports for the bottles B partly on the moving conveyor belt 1 and partly on the bottom 26 of chamber 11. This construction effects movement of the bottles in the chamber 11 when chamber is in the upright position shown in full lines in Figure 3, and at the same time permits the bottles to be moved bodily with the chamber 11 during the rotation of the latter to the position shown by dotted lines in Figure 3.

Vertical guide plates 26 and 27 connect the outlet end 28 of the chamber 11 to the vertical guide plates 29 and 30, respectively, supported by brackets 31 suitably secured to the flanges 6 and 7 of the base 2. It will be evident from the drawings that the guide plates 3, 4, 29 and 30 are alined in pairs directly above the conveyor belt 1; while the chamber 11 is offset rearwardly of the conveyor structure to provide a dual support for the bottoms of the bottles B in the chamber 11, partly on the moving conveyor belt 1 and partly on the relatively fixed bottom 26.

The chamber 11 is designed to hold a predetermined number of bottles before there is any possibility of its being inverted to mix the ingredients of the bottles therein. In this particular case, the predetermined number of bottles is sixteen. To effect inversion of the chamber 11, a clutch operating rod 31 is slidably and rotatably mounted in bearings 32 and 33 formed on two of the stiffening ribs 16 near the discharge end of the machine. The rear end of the rod 31 is bent inwardly to pass through a recess 34 in the end of wall 12 of chamber 11, and forms a stop 35 normally extending across chamber 11 in the path of movement of the bottles B. The lower edge 36 of recess 34 limits the downward movement of said stop 35.

A collar 37, adjustably secured on rod 31, limits the lengthwise movement of stop 35 into the chamber 11. Normally the rod 31 is held with the collar 37 against one end of the bearing 33 by means of the compression spring 38 which is coiled around the rod 31 and is interposed between the other end of bearing 33 and sleeve 39 which is adjustably secured on rod 31 by a set screw 40. The adjustment of sleeve 39 is intended to cause sufficient resistance of the stop 35 to prevent sliding movement of the rod 31 in its bearings 32 and 33 by any pressure less than that induced by the pressure of sixteen bottles in chamber 11, resulting from the frictional pull in the discharge direction of the conveyor belt 1 on the bottoms of these sixteen bottles. Of course, the collar 39 may be adjusted to provide for inversion of the chamber 11 by the pressure of any other desired predetermined number of bottles against the stop 35. The number 16 is given merely by way of example.

When sufficient pressure is exerted against stop 35, the rod 31 slides in its bearings 32 and 33, and carries with it an arm 41 fixed to and extending laterally from the rod 31. During the sliding movement of rod 31, the arm 41 strikes the upper end of one arm 42 a clutch operating bell crank lever which is rotatable about a pivot 43 fixed to a bracket 44 suitably secured to a horizontal flange 45 formed on the L-shaped bracket 24 (see Figures 1, 3 and 4).

Arms 46 and 47 extend in opposite directions from the lower pivoted end of arm 42. The arm 46 is provided at its outer end with a hole 48 through which a stop rod 49 slides freely. The said outer end of arm 46 is normally held in contact with the lower end of a sleeve 50, in which the rod 49 slides and which is suitably secured to the bottom flange 45 of the L-shaped bracket 24, by means of a weight 51 adjustable on the arm 47 to a position obviously determined by the pressure necessary to move the stop 35 in the discharge direction.

The lower end of stop rod 49 is screw-threaded to receive the nuts 52 and 53 on opposite sides of the apertured end of arm 46, whereby the rod 49 is moved into or out of the path of a lug 54 forming part of clutch mechanism to be described presently. The lower end of sleeve 50 is slotted to receive slidably the pin 55 projecting radially from opposite sides of stop rod 49.

A bearing 55' is suitably secured to the horizontal plate 45 of the bracket 24; and a clutch sleeve 56 is journaled at one end in the bearing 55'; the sleeve being shouldered to limit its axial movement in one direction in said bearing 55'. A collar 57 is keyed to the sleeve 56 to limit the axial movement of the sleeve in the other direction, and is provided with a crank arm 58 pivotally connected to one end of a pitman 59 for a purpose to be described later.

The sleeve 56 rotates on and forms a bearing for a shaft 60 which projects through a bearing 61 into a gear case 62. A worm gear 63 is secured to the end of the shaft 60 within the gear case 62, and meshes with a worm 64 suitably fixed to a driven shaft 65. The shaft 65 projects through a bearing 66 on gear case 62, and has secured thereto a pulley 67 driven by a belt 68 which extends around a pulley 69 on the end of the rotor shaft of a motor 70 suitably supported on a standard 71 forming part of the framework of the machine.

The motor mechanism and gearing operated thereby is intended to rotate the clutch shaft 60 continuously to impart intermittent rotation only to the clutch sleeve 56. To effect this intermittent rotation, the clutch shaft 60 has keyed thereon the disk 72 having notches 72' cut radially in the periphery thereof. To impart rotation to the sleeve 56, a cylinder 73 is secured to the said sleeve. A piston 74 slides in the cylinder 73 and a coil spring 75 is mounted in the cylinder to force the piston toward the notched periphery of disk 72.

One end of the piston has a tapered tooth 76 projecting axially therefrom to move into any of the notches 72' in disk 72, when the stop rod 49 is moved out of holding engagement with the lug 54, which projects from piston 74 through a slot 77 formed in the cylinder 73. The contacting portions of the lug 54 and upper end of rod 49 are beveled and the rotations of the parts are timed so that at the end of each complete revolution of the clutch sleeve 56, the rod 49 engages the lug 54, with a cam effect, to withdraw the tooth 76 from any of the notches 72' in which it may have been seated.

As already described, the pitman 59 has its lower end pivoted to the crank arm 58, fixed to the clutch sleeve 56. The other end of the pitman 59 is pivoted to the outer end of a crank arm 78 (see Figure 3) extending radially from a plate 79 which is suitably secured to a stub shaft 80 journaled in the lower part of bearing bracket 21. A gear 81 fixed to shaft 80, meshes with a gear 82 fixed on the end of the shaft 18 to rock the latter in its bearings 20 and 21.

As shown in Figure 3, the crank arms 58 and 78 are so positioned with relation to each other that a complete rotation of the clutch sleeve 56 causes a rocking of the shaft 18 from full to dotted line position and back to full line position. The upper end of lever 42 is bent to form a trip 83 to trip the arm 41 when the chamber 11 starts movement to inverted position. This tripping slides the stop 35 upwardly along the end bottle in contact therewith, until it has cleared this end bottle. The spring 33 immediately pulls the stop lever past the side face of the end bottle. The outer end of the stop 35 is bent to form a comparatively long contact rod 84 which rests after tripping, against the sides of the bottles in the chamber 11 until all have been discharged therefrom. As soon as the last bottle is discharged from the chamber, the comparatively heavy stop 35 and contact rod 84 cause rotation of rod 31 in its bearings, and locates the stop 35 in the path of the next incoming batch of filled and capped bottles.

It will be obvious that the feeding of bottles to the inlet end of the chamber 11 must be timed so that no bottles are fed thereto while the said chamber is being rocked toward and from inverted mixing position. This timing must therefore depend upon the operating periods of the clutch sleeve 56. Accordingly, there is fixed to said sleeve 56 a radial wiper 85 adapted to wipe against the side of a rod 86 fixed to one end of a shaft 87, which is journaled in a bearing standard 88 supported on the plate 45.

Another arm 89 on the opposite side of standard 88 projects radially from the shaft 87 and has its free end apertured to permit a slight free sliding and rocking movement on the screw-threaded end of a rod 90, which is mounted to slide in brackets 91 and 92 depending from the base 2. Nuts 93 and 94 are threaded into the rod 90 on opposite sides of the arm 89, and are spaced apart sufficiently to permit the necessary slight rocking movement of the arm 89 on rod 90.

A collar 95 secured to rod 90 cooperates with bracket 91 to limit the sliding movement of rod 90 in one direction. A coil spring 96 wound around rod 90 has one end butted against one face of bracket 91, and has its other end compressed against a collar 97 fixed to rod 90 to hold said rod with its collar 95 normally in stop contact with bracket 91. The free end of rod 90 (see Figure 7) projects into the path of rotation of a radial stop 98 projecting from a brake wheel 99 fixed to the lower end of a shaft 100, which is journaled between its ends on a bearing member 101 suitably secured to the lower side of base 2.

The shaft 100 has a spur gear 102 fixed thereto to mesh with a pinion 103 fixed to a counter shaft 104 journaled in said member 101 and passing at its upper end through a bearing plate 105 suitably secured to conveyor base 2. A star wheel 106 is fixed to the upper end of shaft 104 and has the blades thereof passed through a slot 107 in the guide plate 4 to engage and control the passage of bottles along the conveyor to the inlet end of the mixing chamber 11.

It will be apparent from the drawings that the continued movement of the conveyor belt 1 along the base 2 will cause the bottles to pile up against one of the blades of the star wheel 106, which can be rotated only when the end of rod 90 has been retracted, by rotation of sleeve 56, from the path of radial stop 98. As a safety measure, the feed control is provided with a friction brake which prevents operation of the star wheel even when rod 90 clears the stop 98, unless and until there are about twenty bottles applying pressure against the blade of the star wheel projecting through the slot 107 in guide plate 4.

The safety measure referred to comprises a rod 108 slidably mounted in brackets 109 and 110 suitably supported by the base 2. One end of this rod 108 is screw-threaded to receive a nut 111 providing for lengthwise adjustment of said rod with respect to a roller 112 rotatably mounted on the upper face of wheel 99. A collar 113 adjustably secured to rod 108 serves as an abutment for one end of a compression spring 114 wound around rod 108, the bracket 110 forming the other abutment for said spring 114. The end of the rod 108 is rounded off so as to slide along the periphery of roller 112 when pressure is applied by said roller against the rounded end to slide the rod 108 in the brackets 109 and 110 against the resistance of the spring 114.

The resistance of spring 114 may be adjusted to permit sliding movement of the rod 108 only when a predetermined number of bottles are exerting pressure against the inwardly projecting blade of the star wheel 106. Where the device is intended to receive sixteen bottles in the inverting chamber, it is desirable that the resistance of spring 114 shall be equal to that exerted by the pressure of twenty bottles against the star wheel.

It will be obvious now that the interaction of rod 90 and a stop 98 will permit feeding operation of the bottles to the mixing chamber 11 only when the chamber is in bottle receiving position above the conveyor; and that the roller 112 and rod 108 will prevent feeding of bottles to said chamber, unless there are more than enough bottles to fill the chamber during one of the intermittent feeding operations. The gears 102 and 103 are in 2:1 ratio, so that the 8-space star wheel must rotate twice during each feeding operation, in order to feed the sixteen bottles to the chamber 11.

It will be evident from the disclosure that the chamber 11 cannot be inverted unless and until the predetermined number of bottles are located in the chamber; and that all feeding of bottles toward this chamber is prevented while the chamber is out of receiving position. It will also be evident that the star wheel mechanism will prevent feeding anything in excess of the fixed number of bottles required to fill the mixing chamber, thereby eliminating all possibility of crowding bottles toward the inlet end of the chamber while the latter is in mixing operation.

In order to prevent all possibility of bottles being fed into the space on the conveyor normally occupied by the chamber 11, during the mixing movements of the said chamber, an L-shaped stop gate 115 is secured at one end to a shaft 116 which is journaled in bearings 117 and 118 suitably fixed to the flange 6 of base member 2.

A leaf spring 119 is fixed at its lower end to the flange 6 and has its free end in sliding contact with a wear plate 120 fixed to the outer edge of the arm 121 of the stop gate 115. The pressure of the spring 119 normally holds the arm 122 of gate 115 projected into the bottle guideway between the guide rails 8 and 9, a slot 123 being formed in the rail 9 to receive the said arm 122 in such projected position.

The gate 115 is intended to be located in stop position only when the chamber 11 is in mixing movement about the axis of shaft 18. In order to hold the gate 115 in inoperative position, the shaft 116 is extended through the bearing 118 in the general direction of the chamber 11 and has fixed to the end thereof a wiper plate 124 arranged in the path of movement of the free end of a wiper 125 which is suitably secured at its other end to the chamber 11. These parts are so arranged and shaped that when the chamber 11 is in bottle receiving position over the conveyor 1, the wiper 125, through the wiper plate 124 holds the shaft 116 rocked, against the pressure of spring 119, in such position as to retain the gate 115 in the inoperative position shown in full lines in Figure 11. As the chamber 11 is moved to mixing position (shown by dotted lines in Figure 11) the wiper 125 clears the plate 124 and permits the spring 119 to rock the gate 115 into its bottle stopping position across the guideway between rails 8 and 9.

A stop gate 126 (see Figures 10 and 14) similar to the gate 115, is mounted some distance beyond the exit end of the chamber 11, and operates, in alternation with the gate 115, to stop a batch of mixed bottles after discharge from the chamber 11 for inspection purposes. This gate 126 has the lower end of its arm 127 fixed to a rock shaft 128 journaled in bearings 129 and 130 suitably secured to flange 6 of base 2.

A leaf spring 131, secured at its lower end to the base 2, has its free end in wiping contact with the inner edge of arm 127, and normally holds the gate 126 with its stop arm 132 in the inoperative position shown by dotted lines in Figure 14. A stop 133 on the shaft 128 is arranged to contact with the flange 6 to limit the rocking movement of the shaft 128 in one direction.

The rocking movement of shaft 128 against the pressure of spring 131 is effected by means of a wiper 134 fixed at one end to chamber 11 and having its free end arranged to wipe against a wiper plate 135 extending radially from and suitably secured to the shaft 128. The wiper plate 135 contacts with the face of base member 2 to limit the clockwise movement of the arm 132 into the guideway between rails 29 and 30.

In order to avoid all possibility of loss of bottles out of the chamber 11 during the rocking movement thereof, each end of the chamber is provided with automatic mechanism for preventing such loss. This mechanism, at the inlet end of chamber 11, includes a pivot stud 136 extending axially parallel to shaft 18 from a rod 137 suitably secured to the rear wall of the chamber 11 near the lower edge thereof. A stop plate 138 is mounted to rotate on stud 136 and is provided near its upper end with laterally projecting pins 139 and 140.

A leaf spring 141 is fixed at its lower end to the rear wall of chamber 11 and has its upper end constantly exerting yielding pressure tending to force the plate 138 across the open end 10 of the chamber 11. A small standard 142 is secured to the bearing 20 and extends upwardly in the path of movement of the pin 139; and is so arranged that when the chamber is in bottle receiving position the stop plate 138 is held in inoperative position, as shown in full lines in Figures 11 and 12. As soon as the chamber 11 is rocked about the axis of shaft 18, the pin 139 is released from contact with standard 142. The pressure of spring 141 on pin 140 immediately moves the plate 138 across the open end 10 of chamber 11 to hold the bottles securely therein.

The stop mechanism at the exit end of the chamber 11 is quite similar to the stop mechanism at the inlet end; and the corresponding parts thereof are identified by the same reference numerals primed. Both mechanisms are set in operation at the same time by rocking movement of the chamber 11; and obviously serve to hold all the bottles securely in said chamber during the rocking movements thereof.

What I claim is:

1. In a machine for mixing the ingredients of bottled liquids; a support, a conveyor for moving filled and sealed bottles in one direction along said support, a chamber hinged to said support in the path of movement of said conveyor, means for feeding a predetermined number of bottles into said chamber, and means operable by the presence of said predetermined number of bottles in said chamber for automatically rocking said chamber about its hinge axis to mix the contents of the bottles therein.

2. In a machine for mixing the ingredients of bottled liquids; a support, a conveyor for moving filled and sealed bottles in one direction along said support, an open ended chamber hinged to said support in the path of movement of said conveyor, a stop yieldingly mounted at the discharge end of said chamber, and means operated by pressure applied to said stop in the direction of movement of said conveyor for rocking said chamber about its hinge axis to mix the contents of bottles received in said chamber.

3. In a machine for mixing the ingredients of bottled liquids; a support, a conveyor for moving filled and sealed bottles in one direction along said support, an open ended chamber hinged to said support in the path of movement of said conveyor, a counting device adjacent the inlet end of said chamber to control the feeding of bottles thereto in predetermined quantities, and means adjacent the outlet end of said chamber operable by the pressure of the said predetermined quantity of bottles for rocking the chamber to mix the contents of the said bottles.

4. In a machine for mixing the ingredients of bottled liquids; a support, a conveyor for moving filled and sealed bottles in one direction along said support, an open ended chamber hinged to said support in the path of movement of said conveyor, a counting device adjacent the inlet end of said chamber to control the feeding of bottles thereto in predetermined quantities, means adjacent the outlet end of said chamber operable by the pressure of the said predetermined quantity of bottles for rocking the chamber to mix the contents of the said bottles, said means being adjustable in accordance with the pressure applied by any desired predetermined number of bottles.

5. In a machine for mixing the ingredients of bottled liquids; a support, a conveyor for moving filled and sealed bottles in one direction along said support, an open ended chamber hinged to said support in the path of movement of said conveyor, a stop yieldingly mounted at the discharge end of said chamber, means operated by pressure applied to said stop in the direction of movement of said conveyor for rocking said chamber about its hinge axis to mix the contents of bottles received in said chamber, and means for varying the resistance of said stop in accordance with variations in pressure applied thereto.

6. In a machine for mixing the ingredients of bottled liquids; a support, an open ended chamber movably mounted over said support, a conveyor through the bottom of said chamber for feeding bottles therethrough, means in advance of said chamber for separating the bottles on said conveyor into batches of predetermined number, a yielding stop extending across the discharge end of said chamber, and means controlled by the pressure on said stop of a batch of bottles in said chamber for inverting the filled chamber to mix the contents of the bottles therein.

7. In a machine for mixing the ingredients of bottled liquids, a support, an open ended chamber movably mounted over said support, a conveyor through the bottom of said chamber for feeding bottles therethrough, means in advance of said chamber for separating the bottles on said conveyor into batches of predetermined number, a yielding stop extending across the discharge end of said chamber, means controlled by the pressure of a batch of bottles in said chamber for inverting the filled chamber to mix the contents of the bottles therein, and means for varying the yielding resistance of said stop in accordance with the number of bottles in the batches fed into said chamber.

8. In a machine for mixing the ingredients of bottled liquids, a support, a conveyor for moving filled and sealed bottles in one direction along said support, a chamber open at its opposite ends and movably connected to said support to receive bottles fed thereto by said conveyor, means operable only by the pressure of a predetermined number of bottles in said chamber for moving the chamber to mix the contents of the bottles therein, and means operable by the movement of a filled chamber for closing the opposite end of the chamber.

9. In a machine for mixing the ingredients of bottled liquids, a support, a conveyor for moving filled and sealed bottles in one direction along said support, a chamber open at its opposite ends and movably connected to said support to receive bottles fed thereto by said conveyor, means operable only by the pressure of a predetermined number of bottles in said chamber for moving the chamber to mix the contents of the bottles therein, stops pivoted to opposite ends of said chamber, yielding means fixed to said chamber and engaging said stops for normally holding the stops in position to close the ends of said chamber, and means fixed to said support to hold said stop from closing position only when the chamber is in bottle receiving position.

10. In a machine for mixing the ingredients of bottled liquids; a support, an open ended chamber movably mounted over said support, a conveyor passing through the bottom of said chamber for feeding bottles therethrough, means in advance of said chamber for separating the bottles on said conveyor into batches of predetermined number, means operable by the pressure of a batch of bottles in said chamber for inverting the filled chamber to mix the contents of the bottles therein, a stop gate movably mounted on said support adjacent the inlet end of said chamber, yielding means for normally holding said gate in the path of movement of the bottles on said conveyor, and means on the said chamber for holding said gate in inoperative position only when the chamber is in bottle receiving position.

11. In a machine for mixing the ingredients of bottled liquids; a support, an open ended chamber movably mounted over said support, a conveyor passing through the bottom of said chamber for feeding bottles therethrough, means in advance of said chamber for separating the bottles on said conveyor into batches of predetermined number, means operable by the pressure of a batch of bottles in said chamber for inverting the filled chamber to mix the contents of the bottles therein, stop gates movably mounted on said support above said conveyor and at opposite ends of said chamber, means for normally holding the gate at the inlet end of said chamber in the path of movement of the bottles on said conveyor and for normally holding the other gate out of such path, and means on said chamber for holding the first named gate out of bottle stopping position and the second named gate in such position only when the chamber is in bottle receiving position.

FRANK E. FOWLER.